No. 769,144. PATENTED SEPT. 6, 1904.
G. W. & R. W. BOSTWICK.
SELF LEVELING APPARATUS FOR FURNITURE.
APPLICATION FILED APR. 1, 1903.
NO MODEL. 3 SHEETS—SHEET 2.

Witnesses:

Inventors:

No. 769,144. PATENTED SEPT. 6, 1904.
G. W. & R. W. BOSTWICK.
SELF LEVELING APPARATUS FOR FURNITURE.
APPLICATION FILED APR. 1, 1903.
NO MODEL. 3 SHEETS—SHEET 3.

Witnesses:
Inventors:

No. 769,144.                                                        Patented September 6, 1904.

UNITED STATES PATENT OFFICE.

GRANT W. BOSTWICK AND ROBERT W. BOSTWICK, OF PITTSBURG, PENNSYLVANIA.

SELF-LEVELING APPARATUS FOR FURNITURE.

SPECIFICATION forming part of Letters Patent No. 769,144, dated September 6, 1904.

Application filed April 1, 1903. Serial No. 150,575. (No model.)

*To all whom it may concern:*

Be it known that we, GRANT W. BOSTWICK and ROBERT W. BOSTWICK, citizens of the United States, residing at Pittsburg, in the county of Allegheny and State of Pennsylvania, have invented certain new and useful Improvements in Self-Leveling Apparatus for Furniture, of which the following is a specification, reference being had therein to the accompanying drawings, forming part of this specification, in which—

Figure 1:
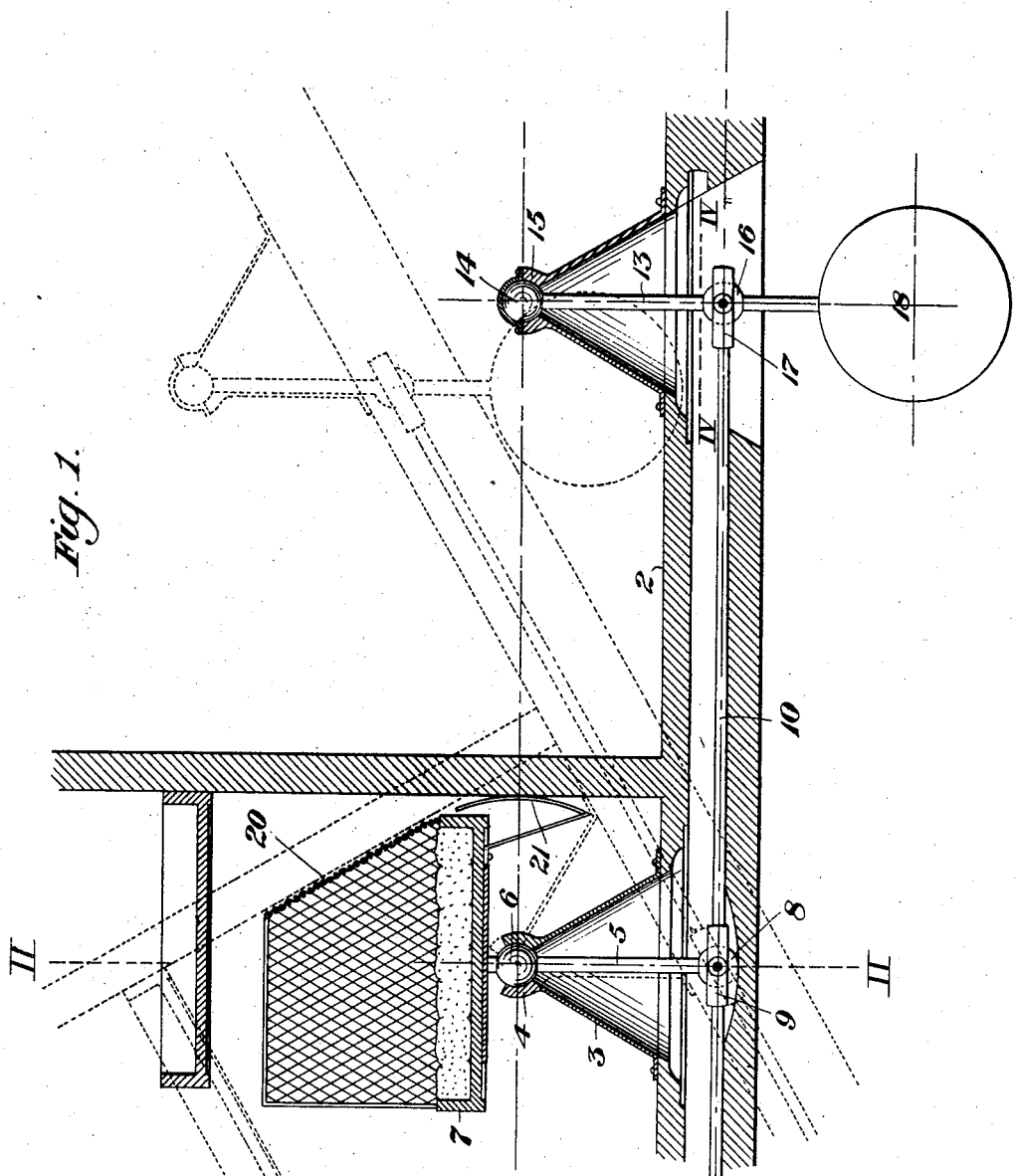
Figure 2:
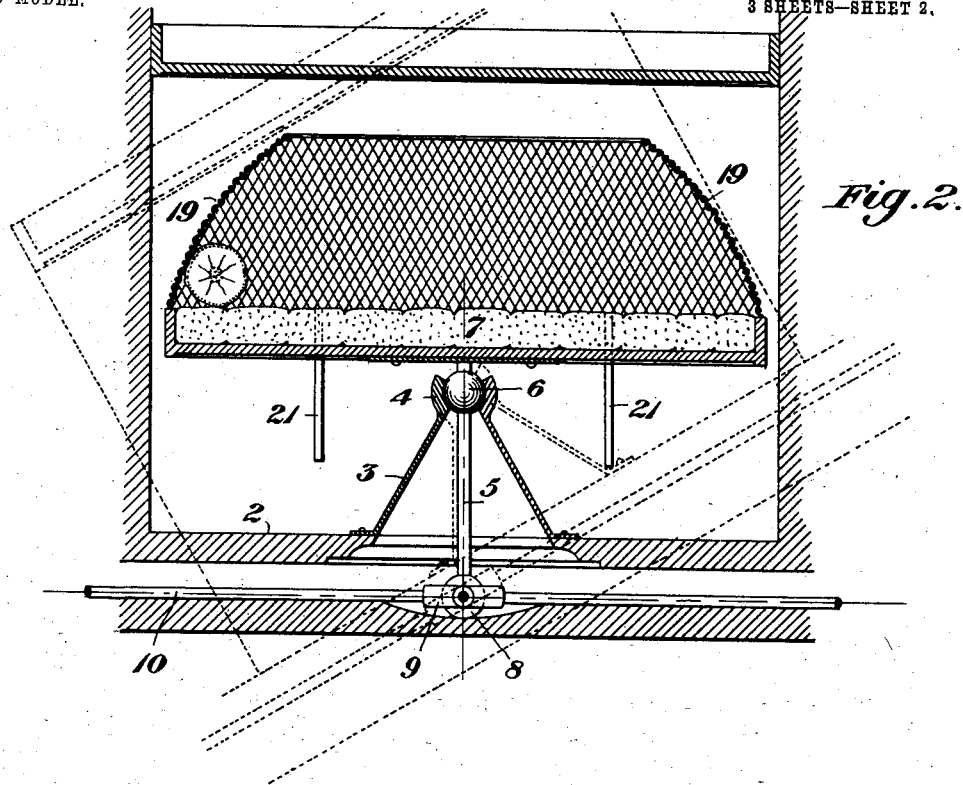
Figure 3:
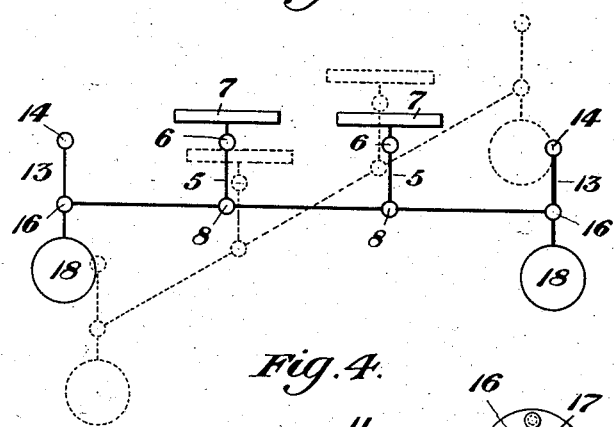
Figure 4:
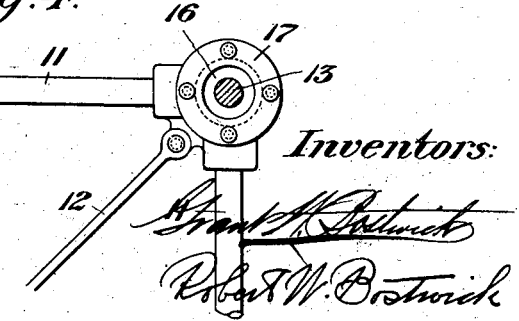
Figure 5:
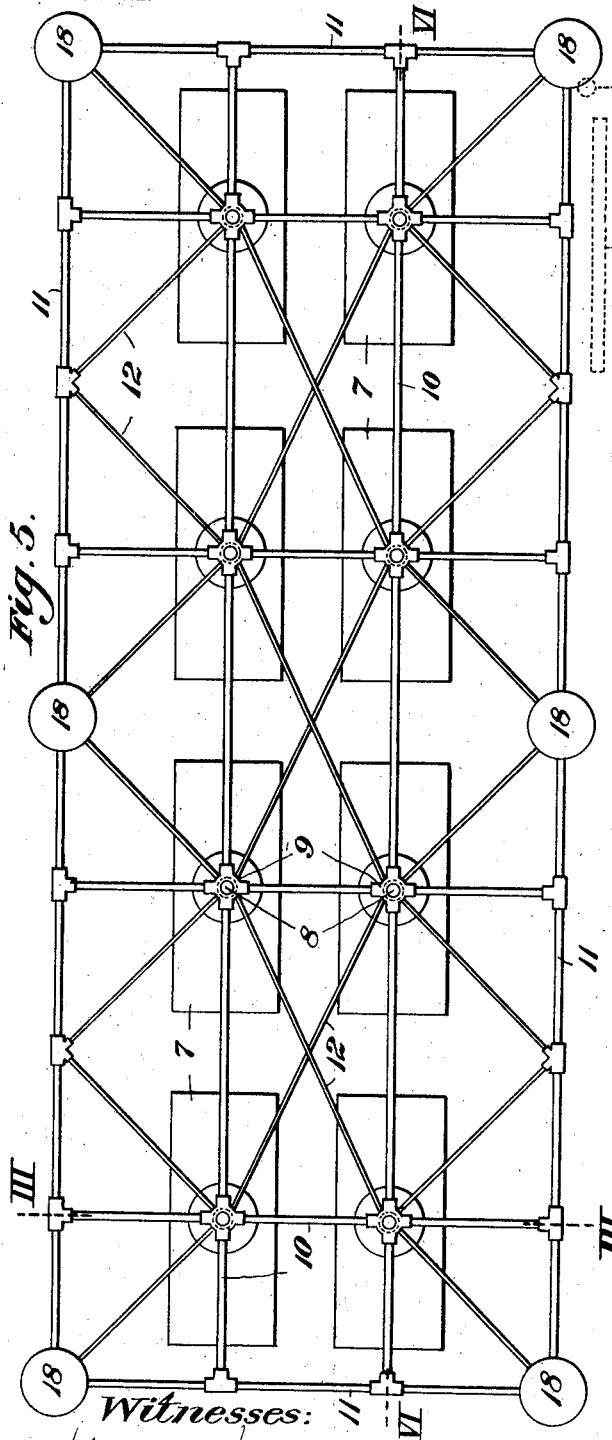
Figure 6:
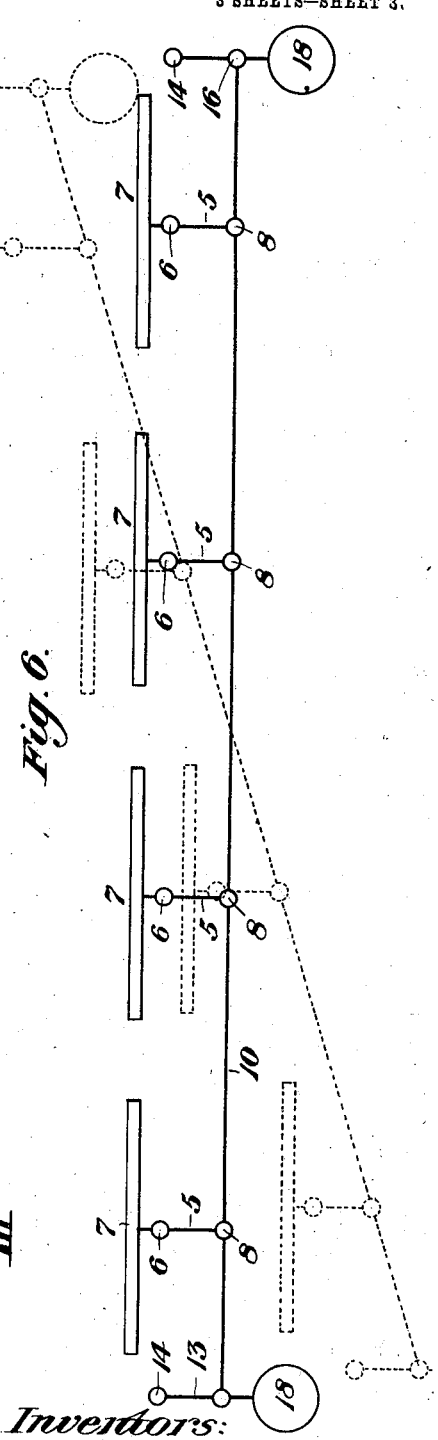

Figure 1 is a view in sectional elevation of a berth supported upon a stem combined with our self-leveling apparatus with a portion of the controlling mechanism connected with the stem. Fig. 2 is a cross-sectional view of Fig. 1 on the line II II thereof. Fig. 3 is a cross-sectional diagrammatic view on the line III III of Fig. 5. Fig. 4 is a sectional detail view on the line IV IV of Fig. 1, showing the universal joint. Fig. 5 is an under plan view of the controlling frame and its connected counterweights, showing the arrangement of a series of gravity-controlled berths. Fig. 6 is a diagrammatic vertical sectional view on the line VI VI of Fig. 5, showing a series of berths in their normal position and indicating in dotted lines the varying positions of the berths and of the gravity-actuated controlling means.

Our invention relates to improvements in self-leveling furniture—such as berths, tables, chairs, &c.—with particular reference to the application to furniture as used on floating vessels or other similar structures subject to variation from a horizontal position as to deck or floor levels.

The objects in view have been to provide a central supporting element adapted to support the berth or other structure and to normally conform to and be maintained in a vertical position independent of its supporting foundation.

The invention also refers to means whereby a series or plurality of such vertical supporting devices are simultaneously controlled and maintained, so that the upper supporting structure will be constantly held in a horizontal position.

The invention as illustrated in the drawings is particularly adapted to ship furniture, such as berths, it being readily understood that it may also be applied to chairs, tables, &c., and it includes the mechanism and other details of construction which will be more fully hereinafter described and claimed.

Referring now to the drawings, 2 represents the floor or deck of a vessel, upon which rests a coniform upwardly-projecting hollow support 3, preferably formed of cast metal, either solid or of other suitable design, in the upper portion of which is provided the ball-bearing 4, having interior spherical surfaces. These ball-bearing terminals are preferably separable and so designed as to permit of the easy assemblage of the parts and with sufficient clearance above and below to provide for the oscillation of frame 3 around the center supporting-stem 5. This stem is provided with a sphere or ball 6, secured to or formed integral with the stem and adapted to neatly fit into the interior of the ball-bearing support 4, the stem extending upwardly and downwardly, as clearly shown, and supports at its upper end the article of furniture, as a berth 7, as clearly shown in Figs. 1 and 2. As thus constructed it will be seen that if the stem 5 is maintained in a vertical position independent of the movement of the deck and its supporting-bearings 3 the deck may rise and fall at any point either longitudinally, laterally, or otherwise and that the berth 7 will remain level.

We will now describe the means by which the stem 5 is maintained in a vertical position.

The lower end of the stem 5 terminates in a ball 8, which is engaged by a surrounding ball-bearing 9 of any suitable design or any other equivalent construction adapted to provide for free movement and oscillation, and with which ball-bearing are connected the rods or other elements 10 of a lower depending regulating-framework, by which the stem 5 is always maintained in a true vertical position.

As shown in Fig. 5, the rods 10 of the frame diverge in opposite directions from the bearings 8 both longitudinally and laterally and are connected in one entire structure by a surrounding similar frame 11, while diagonal truss-rods 12 or any other suitable bracing elements are incorporated with the frame, so as to provide a rigid foundation on a normally-horizontal plane. A series of berths are assembled and connected with such controlling-framework, although it will be readily understood that a single berth or any desired number may be similarly arranged, according to the dimensions or design of the vessel or other structure, and that they may also be arranged in a continuous line, if desired, and we have not considered it necessary to show such various arrangements, as they are more properly within the province of the designing engineer or builder. At the corner of the controlling-framework and at intermediate positions, if desired, or at any other suitable point are located supporting stems or rods 13, Figs. 1, 3, 4, and 6, provided at their upper portion with balls 14, Figs. 1, 3, 4, and 6, or their equivalent adapted to engage in universal or ball bearings 15, of any suitable design, but so arranged that they will be located on the same plane as the ball-bearings 4 and ball 6. If desired, the bearings may be also provided with an interior roll of small bearing-balls, the supporting-framework being hollowed out in a manner similar to support 3 to permit movement of the bearing 15 with relation to ball 14 of the stem 13, Figs. 1, 3, 4, and 6. These stems 13 are provided with supporting-balls 16 or their equivalent, around which are assembled the embracing ball-bearings 17 of the controlling-framework or other equivalent operative construction, either at the corner or intermediate positions, and by which bearings the framework is partially supported. It will also be understood that a portion of the weight of the framework is carried by the depending ball 8 of the stem 5. To the lower end of the stems 13 are attached the gravity weights or balls 18, of suitable weight and design to suit varying conditions of each particular case, but preferably of several hundredweight, so as to provide effective inertia. Any independent lateral movement of the stems 13 or 5 with relation to the frame is prevented by the engagement of bearings 17 and 9, and it will be understood that these bearings are accurately fitted and adjusted, so as to take up all lost motion and wear. As thus constructed it will be seen that the weights 18 will constantly tend to hold the stems 13 in a vertical position by reason of the fact that they exert the force of gravity through the frame 11, and all of the stems are connected to and by said rigid frame 11. It will also be seen that the force of each weight will be exerted throughout the framework in every direction, so as to correct any tendency of the stems to assume other than a vertical position, and it also follows that the stems 5 will be absolutely controlled by the rigid frame and will maintain a vertical position. This is due not only to the accumulated inertial force of the connected weights, but also to the excessive leverage which results from their joint and simultaneous operation exerted through the frame in a lateral direction against the lower ends of stems 5. The leverage of the frame as thus constructed is proportionally greater than any tendency of the stems 5 or their supporting furniture to deviate from vertical or horizontal positions, respectively, independent of whatever load is carried by the furniture or however distributed.

The ends of the berth are preferably protected by guards or shields 19, and the back is protected by a similar shield 20, of wire-netting or any other similar material, the top also being covered, if preferred. Such end and back guides are slanted upwardly and inwardly, so that when the surrounding walls exterior to the berth 7 move in conformity with the vessel the occupant will be protected from contact, as will also these portions of the berth. At the back portion the berth is provided with downwardly-extending fenders 21, of suitable material, as metal, preferably curved, (from center of the ball 6,) as shown in Fig. 1, against which the back of the state-room will bear, but free to move in any direction, while maintaining the berth in alinement with the back wall and preventing rotation.

We are aware that self-leveling devices for furniture have been patented wherein a counterweight is attached to a vertical supporting-stem, but believe that we are the first to provide the mechanism shown and described, whereby the corrective inertial action of a frame and a series of surrounding connected weights is applied to one or a number of pendently-supported stems.

The operation is obvious from the foregoing description.

The advantages of the invention will be appreciated by all those who are skilled in the art. It is very efficient, simple, durable, and inexpensive and is capable of installation without interference with the head room under the deck, while requiring but a minimum of space either above or below.

When used with berths, as shown and described, the controlling-frame may be assembled below the floor and above the lower ceiling of the deck or below the ceiling and the connected elements, so designed as to avoid contact or interference with the deck structure.

Changes and variations may be made in the design, proportion, arrangement, or other details of construction by the skilled mechanic, or the controlling mechanism may be utilized with other articles than furniture with good results; but all such are to be considered as within the scope of the following claims.

What we claim is—

1. In self-leveling apparatus, the combination with a supporting-stem provided with a universal-bearing support and a downward extension, of a gravity-actuated controlling-frame in engagement with the stem, and suspended from bearings on the same plane as said bearing-support, substantially as set forth.

2. In self-leveling apparatus, the combination with a supporting-stem provided with a universal-bearing support and a downwardly-extending terminal, of a gravity-actuated controlling-frame having a universal joint in engagement with said stem and supporting means suspended from bearings and connected with the frame on the same planes respectively as said bearings, substantially as set forth.

3. In self-leveling apparatus, the combination with a supporting-stem provided with a universal-bearing support and a downward extension, of a gravity-actuated controlling-frame in engagement with the stem, and independent gravity-controlled means connected with the frame at positions lateral to the stem, substantially as set forth.

4. In self-leveling apparatus, the combination with a supporting-stem provided with a universal-bearing support and a downward extension, of a gravity-actuated controlling-frame in engagement with the stem, and a series of independently-supported depending weights connected with the frame, substantially as set forth.

5. In self-leveling apparatus, the combination with a supporting-stem provided with a universal-bearing support and a downward extension, of a gravity-actuated controlling-frame in engagement with the stem, and a series of universally and independently supported weights having universal-joint connections with the frame, substantially as set forth.

6. A self-leveling berth consisting of a vertical stem provided with a bearing-ball, a hollow coniform socket-support therefor, and a berth supported upon the upper end of the stem and provided with downwardly-extending fenders at its back, with means for maintaining the stem in a vertical position, substantially as set forth.

7. A self-leveling berth consisting of a stem provided with a bearing-ball, a hollow coniform supporting-socket therefor, a berth supported at the top of the stem provided with back and end protecting-shields, and downwardly-extending fenders, with means for maintaining the stem in a vertical position, substantially as set forth.

In testimony whereof we affix our signatures in presence of two witnesses.

GRANT W. BOSTWICK.
ROBERT W. BOSTWICK.

Witnesses:
   THOS. B. McKAIG,
   D. O. BLACK.